United States Patent [19]
Collins

[11] Patent Number: 5,489,111
[45] Date of Patent: Feb. 6, 1996

[54] HIDDEN TRAILER HITCH

[76] Inventor: Thomas L. Collins, P.O. Box 9813, Houston, Tex. 77213

[21] Appl. No.: 291,192

[22] Filed: Aug. 16, 1994

[51] Int. Cl.[6] .............................. B60D 1/00; B62D 43/04
[52] U.S. Cl. ...................... 280/495; 280/491.5; 414/463
[58] Field of Search .............................. 280/495, 491.1, 280/491.5, 496, 497, 500, 415.1, 502, 505; 414/463, 464

[56] References Cited

U.S. PATENT DOCUMENTS

| | | | |
|---|---|---|---|
| 2,400,274 | 5/1946 | Ullman | 414/463 |
| 2,707,650 | 5/1955 | Lawton, Jr. | 280/500 X |
| 2,747,892 | 5/1956 | Jones | 280/491.5 |
| 3,435,971 | 4/1969 | Powell | 414/463 |
| 3,463,514 | 8/1969 | Warner | 280/495 |
| 3,717,362 | 2/1973 | Johnson | 280/550 X |
| 3,768,837 | 10/1973 | Reese | 280/495 |
| 3,952,894 | 4/1976 | Mendez | 414/463 |
| 4,032,170 | 6/1977 | Wood | 280/495 |
| 4,498,835 | 2/1985 | Yasue et al. | 414/463 |
| 4,738,464 | 4/1988 | Putnam | 280/500 |
| 5,094,469 | 3/1992 | Yamamoto et al. | 280/500 |
| 5,102,156 | 4/1992 | Fink et al. | 280/495 |
| 5,149,122 | 9/1992 | Helber | 280/495 X |
| 5,277,448 | 1/1994 | Colibert | 280/495 |

Primary Examiner—Margaret A. Focarino
Assistant Examiner—F. Zeender
Attorney, Agent, or Firm—Bush, Moseley, Riddle & Jackson

[57] ABSTRACT

A hidden, receiver type trailer hitch is provided for vehicles and comprises an elongate curved or straight transverse tubular strut of rectangular cross-sectional configuration and having reinforced horizontal connection plates at each end of the strut for bolted connection of the strut to the lower surface of the longitudinal frame members of a vehicle. Vertical connection plates are connected by welds to the outside edges of the horizontal connection plates and project upwardly from the horizontal connection plates for bolted connection to the outside side walls of the frame members. A tubular hitch receiver is connected by welds to the upper wall of the transverse strut and is reinforced by reinforcing plates that are connected by welds to both the side walls of the receiver and the front wall of the transverse strut. A spare tire lift relocator is connected transversely of the frame members and provides a relocating mount for the spare tire lift mechanism with which the vehicle is provided to provide ample space forwardly of the trailer hitch for storage of a full size spare wheel and tire assembly. The trailer hitch mounting system locates the receiver of the hitch in registry with a central rear opening of the bumper or roll pan at the rear of the vehicle. An actuator guide element is fixed to the hitch adjacent the receiver and provides a guide for the spare tire lift actuator when extended through the central rear opening to engage the actuator shaft of the lift.

19 Claims, 3 Drawing Sheets

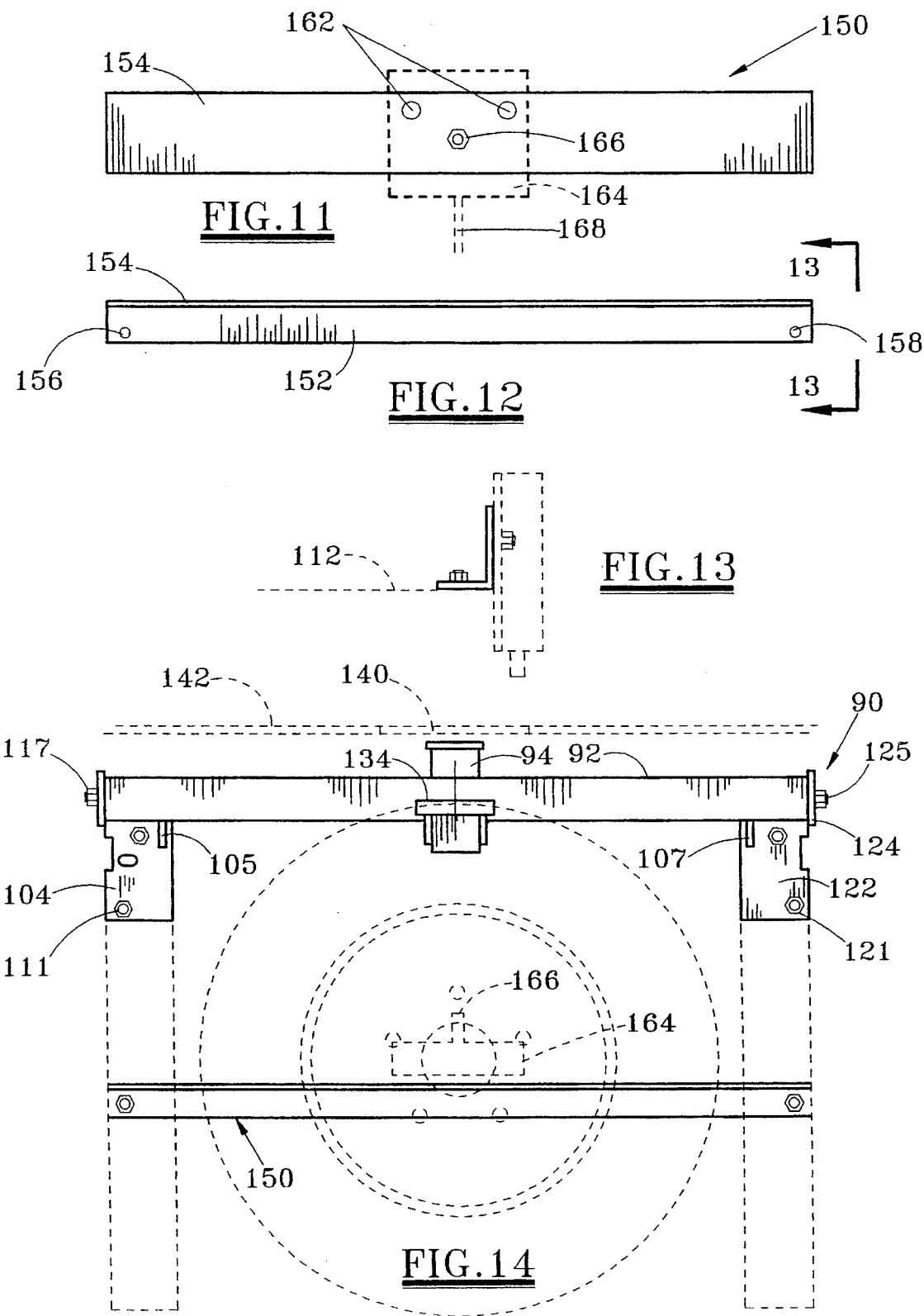

HIDDEN TRAILER HITCH

FIELD OF THE INVENTION

This invention relates generally to "receiver type" trailer hitches for automotive vehicles which typically incorporates a generally rectangular tubular receiver in fixed assembly with the vehicle frame structure, the receiver being adapted to receive a removable hitch bar that is secured within the hitch receiver by a retainer pin. More specifically, the present invention concerns the provision of a hidden, receiver type trailer hitch structure which is typically bolted to the frame of a vehicle such as a light truck vehicle, commonly referred to as a "pickup truck" and which is oriented with respect to the vehicle frame such that the hitch receiver is positioned in registry with a centrally located truck bumper opening or the license plate opening of a decorative roll pan so that it is normally hidden from view by a pivotal license plate or a removable cover plate. The hitch may be used in conjunction with a spare tire relocator to permit the mounting of a conventional sized spare tire and wheel assembly beneath the bed of the light truck. Though this invention is described particularly in connection with light truck restorations such is not intended as limiting the scope of the invention. The hidden trailer hitch of this invention is applicable to a wide range of vehicles, including sedans, vans, station wagons, etc.

BACKGROUND OF THE INVENTION

Many if not most light truck type automotive vehicles are provided with trailer hitches to enable the towing of trailers by the truck. In many cases, the vehicle bumper is provided with a hitch mount platform enabling one or more ball type hitches to be mounted directly to the bumper so that the bumper becomes the towing connection between the vehicle structure and the trailer. Of late, especially for use in conjunction with deluxe pickup trucks, rear bumpers are provided which are highly chromed for pleasing appearance. To maintain the pleasing appearance of the rear portion of the vehicle structure, hidden trailer hitches have been provided which are mounted to the frame structure of the vehicle and provide a trailer hitch receiver that is exposed through a license plate opening in the bumper. Thus, when use of the trailer hitch is desired the license plate holder is simply pivoted upwardly or downwardly to an out of the way position and the hitch bar is inserted into the receiver and secured with its retainer pin. When a trailer hitch of this character is installed the receiver is typically fixed centrally of a transverse hitch strut having its extremities bolted or otherwise secured to the vehicle frame. This transverse strut however is located in space that would otherwise be occupied by a full size spare wheel and tire assembly which, in many cases is raised and lowered by a spare tire retainer and lift mechanism that is secured to the vehicle frame beneath the truck. For this reason when a hidden trailer hitch is employed a full size spare wheel and tire assembly can not normally be located beneath the bed of the truck and thus must be transported at another suitable location, such as within the bed of the truck. This is disadvantageous however because spare wheel and tire assemblies carried within the bed of the truck can bounce out of the truck bed and be lost and can be and are readily stolen. Further, if the spare wheel and tire assembly are mounted and locked within the bed of the pickup truck the mounting and locking mechanism is typically expensive and cumbersome and detracts from the pleasing appearance of the vehicle as well as taking up truck bed space. The only spare wheel and tire assembly that can be mounted beneath the truck bed of the vehicle when hidden hitches are employed is a small dimension spare wheel and tire assembly, typically referred to as a "donut" which is only intended for very limited vehicle operation. In cases where large heavy trailers are towed by the vehicle, the use of donut type spare wheel and tire assemblies even for limited vehicle operation can be quite dangerous.

For the purpose of vehicle conversions to provide for the aesthetically pleasing appearance of the rear portion of a light truck vehicle the vehicle bumper is often replaced by a decorative bumper typically referred to as a "roll pan" which may be composed of fiberglas, a polymer material or a metal material. The roll pan is generally intended to be painted with the same color as the vehicle or a color that is pleasing in relation to the color of the vehicle. A roll pan that is frequently used for truck conversions of this nature is typically referred to as the ZR1 roll pan which includes the tail light mounts that replace the tail lights of the truck. This roll pan is of contoured, decorative appearance and defines a central license plate opening. Typically this license plate opening is covered by a pivotally mounted license plate support to which the license plate of the vehicle is secured by means of screws or bolts. Ordinarily, when roll pans are employed to define the rear portion of a vehicle conversion it is not practical to employ a trailer hitch. Obviously this is a significant disadvantage to truck owners who prefer the decorative appearance of a light truck conversion but who also wish to tow trailers such as, boat trailers, horse/cattle trailers, etc. To overcome this disadvantage hidden trailer hitches have been employed that position a trailer hitch receiver in registry with the license plate opening thus permitting the trailer hitch to be exposed to view only when a trailer hitch drawbar is in assembly with the hidden hitch receiver. As mentioned above however the trailer hitch typically occupies a portion of the space that is needed for mounting a full size wheel and tire assembly beneath the bed of the pickup truck. Thus, when trailer hitches of this nature are employed the limited available space permits only a donut type spare wheel and tire assembly to be mounted beneath the pickup bed. If a full size spare wheel and tire assembly is transported, it must be transported in another location such as in the bed of the pickup truck.

It is desirable therefore to provide a hidden, receiver type trailer hitch mechanism which is mounted to the vehicle frame structure in such manner that the receiver is oriented in registry with a central opening of a vehicle bumper or roll pan so that ample space remains beneath the bed of the pickup truck for mounting a full size spare wheel and tire assembly. It is also desirable to provide in combination with the hidden receiver type trailer hitch a spare tire support and lift relocator which reorients a full size spare wheel and tire assembly by moving its support and lift mount forwardly so that the spare tire can be supported beneath the bed of the pickup truck without interfering with the trailer hitch or any other truck structure.

Many trailer hitch devices are adapted for assembly to the frame of a pickup truck of other such vehicle by means of vertical connection flanges of significant length. These hitch connection systems are typically provided with vertical risers which are connected to respective ends of a transverse trailer hitch strut and which are provided with rather small connection flanges that are bolted or otherwise secured to the frame of the vehicle. The vertical risers necessary to position the hitch receiver lower than the truck bumper. These trailer hitch risers and connection flanges, because they define lever arms of significant length, generally can be characterized as the "weak point" of the trailer hitch structure. If significant force is applied to trailer hitches of this type, the hitch risers can yield to the extent that they fail. If this happens, obviously the connection of the trailer hitch with the vehicle can fail and significant damage can result both to the vehicle and the trailer. In some cases, the trailer hitch can be completely torn away from the frame structure of the vehicle so that the vehicle connection with the trailer can become completely separated. It is desirable therefore to provide a hidden, receiver type trailer hitch having a transverse trailer hitch strut with its respective ends bolted or otherwise secured to the frame structure of the vehicle to thus eliminate the weakness that is ordinarily present when riser type trailer hitch/vehicle frame connections are employed.

Another weakness of conventional receiver type trailer hitches is that safety chain receptacles are provided that are typically defined by a transverse safety chain bar having openings at each of its ends or safety chain connectors that are fixed to other portions of the vehicle structure. These safety chain connections are often relatively weak and therefore can be torn away especially if the trailer being towed is of significantly heavy weight. It is therefore desirable to provide a safety chain connection structure that is fixed directly to the main transverse strut of the trailer hitch structure to thereby provide for secure retention of the safety chains in the event the trailer connection with the vehicle should be lost for any reason.

SUMMARY OF THE INVENTION

It is a primary feature of the present invention to provide a novel hidden, receiver type trailer hitch for light trucks which positions the receiver of the trailer hitch centrally of the rear of the vehicle and in registry with a central opening in the bumper or roll pan of the truck.

It is another feature of this invention to provide a novel hidden, receiver type trailer hitch for light trucks which is positioned to accommodate location of a conventional full size wheel and tire assembly beneath the bed of the light truck.

It is also a feature of the present invention to provide a novel hidden, receiver type trailer hitch and spare tire locator assembly which are both fixed to the frame structure of a light truck for location of a spare wheel and tire assembly forwardly so as to provide clearance for the hidden trailer hitch and to permit under bed storage for a full size spare tire.

It is even a further feature of this invention to provide a novel hidden, receiver type trailer hitch having an elongate transverse strut with connection flanges at its extremities for direct mounting of the transverse strut to the frame of the vehicle to thus minimize the lever arm that might otherwise be defined by the trailer hitch/vehicle frame connection.

It is also a feature of this invention to provide a novel hidden, receiver type trailer hitch that is effectively designed for use in conjunction with luxury conversions of light trucks.

It is also a feature of this invention to provide a trailer hitch having greater ground clearance to minimize the possibility of damage to the trailer tongue or vehicle when uneven road surfaces are encountered.

It is even a further feature of this invention to provide a novel hidden, receiver type trailer hitch for light trucks which includes a main transverse strut having horizontal and vertical connection flanges at its respective extremities for connection to the bottom and side of each vehicle frame member to thus provide a hidden trailer hitch of exceptional load restraining capability.

Briefly, according to the principles of the present invention a trailer hitch is provided having an elongate, curved or straight main transverse strut having a rectangular tube type hitch receiver that is connected by welding or by any other means to the central portion thereof. The centrally located receiver is reinforced at its connection with the transverse strut by a plurality of reinforcing webs, gussets or structural reinforcing plates. Connection flanges, also reinforced by gussets or reinforcing plates are welded or otherwise fixed to respective extremities of the main transverse strut. One of the connection flanges is located horizontally for bolted connection to the bottom of respective longitudinal frame members of the vehicle. Other connection flanges are oriented vertically for bolted connection to side portions of the longitudinal frame members. These connection flanges, being fixed directly to the ends of the transverse strut, are located so as to minimize the lever arms through which forces are transmitted from the transverse strut of the trailer hitch to the frame of the vehicle. These horizontal and vertical connectors also provide for connection of exceptional structural integrity with the vehicle frame so that the resulting hitch can typically maintain a higher load supporting classification as compared with other trailer hitches.

A safety chain connector is provided which is directly welded or otherwise fixed to the central portion of the main transverse strut so that it provides exceptional strength for retention of the forces that may be provided through safety chains. Additionally, a spare tire actuator guide is connected to the rear portion of the receiver tube assembly and is oriented for guiding the spare tire actuator bar so that operation of the spare tire lift mechanism is accessible through the central opening of the vehicle bumper or roll pan.

The trailer hitch mechanism is completed by a spare tire relocator having a transverse spare tire locator strut having its respective ends bolted to the frame structure of the vehicle and positioned to locate the spare tire lift of the vehicle forwardly of its normal location. Such forward location of the spare tire lift provides ample space between the trailer hitch and other frame members of the vehicle structure to accommodate support of a full size spare wheel and tire assembly beneath the bed of the truck. Thus, when the hidden receiver type trailer hitch and the spare tire locator are utilized in combination it is not necessary to provide a small dimension, donut type spare tire for emergency use and it is not necessary to locate a full size spare wheel and tire assembly within the bed of the truck or at another location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 1:
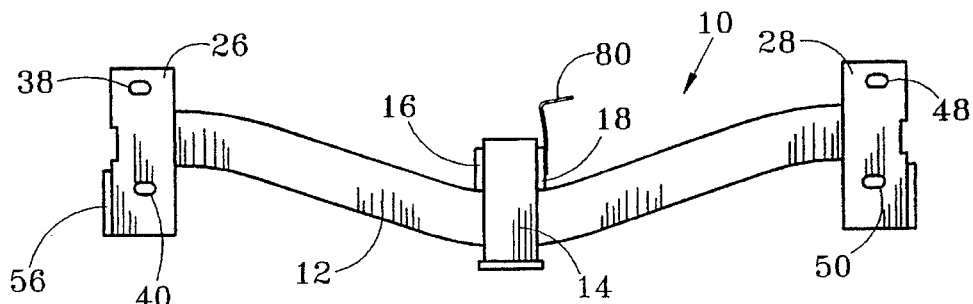

FIG. 1 is a top view of a hidden receiver type trailer hitch which is constructed in accordance with the principles of the present invention and represents the preferred embodiment of the invention.

Figure 2:
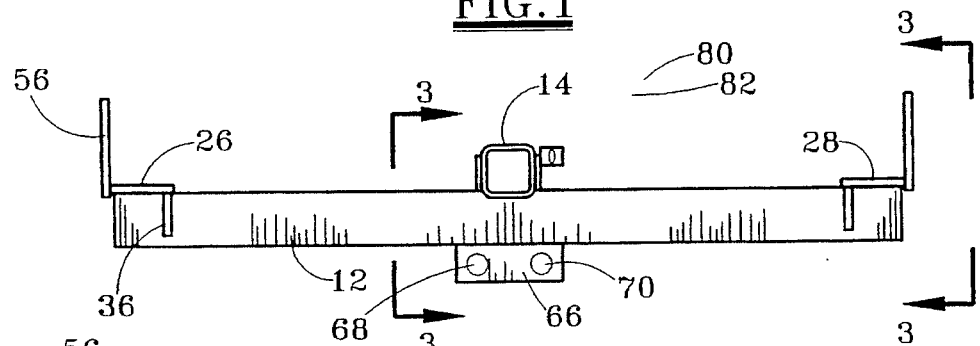

FIG. 2 is a front elevational view of the trailer hitch of FIG. 1.

Figure 3:
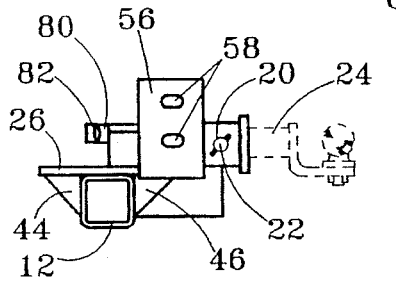

FIG. 3 is an end view of the trailer hitch of FIGS. 1 and 2 taken along line 3—3 of FIG. 2.

Figure 4:
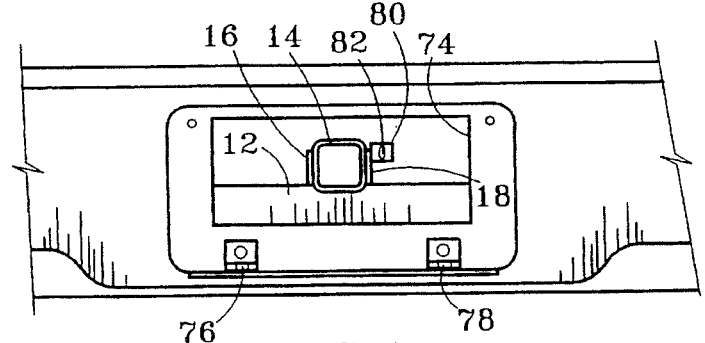

FIG. 4 is a partial rear view of a vehicle showing positioning of the central portion of the trailer hitch of FIGS. 1–3 in registry with the license plate opening of a bumper or roll pan.

Figure 5:
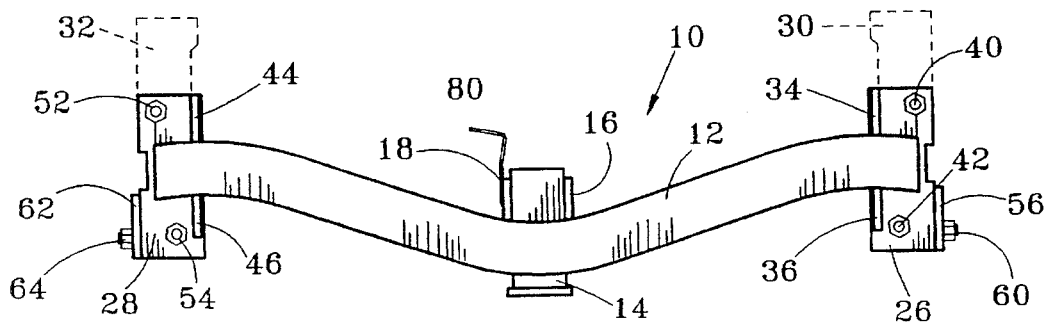

FIG. 5 is a bottom view of the trailer hitch of FIGS. 1–3.

Figure 6:
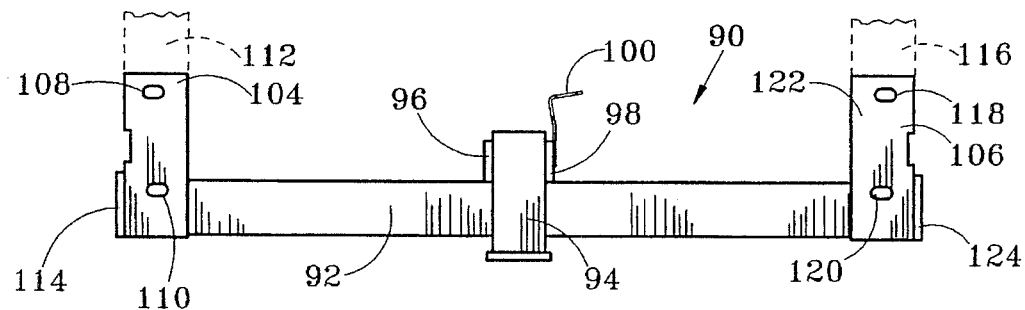

FIG. 6 is a top view of a hidden receiver type trailer hitch representing an alternative embodiment of the present invention.

Figure 7:
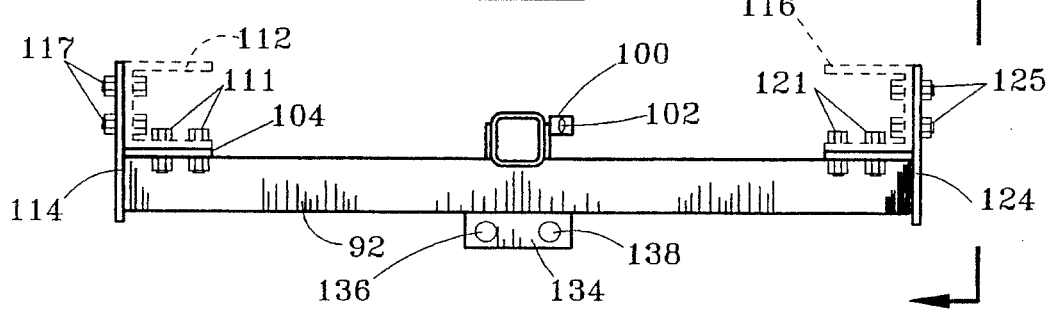

FIG. 7 is a front elevational view of the trailer hitch of FIG. 6.

Figure 8:
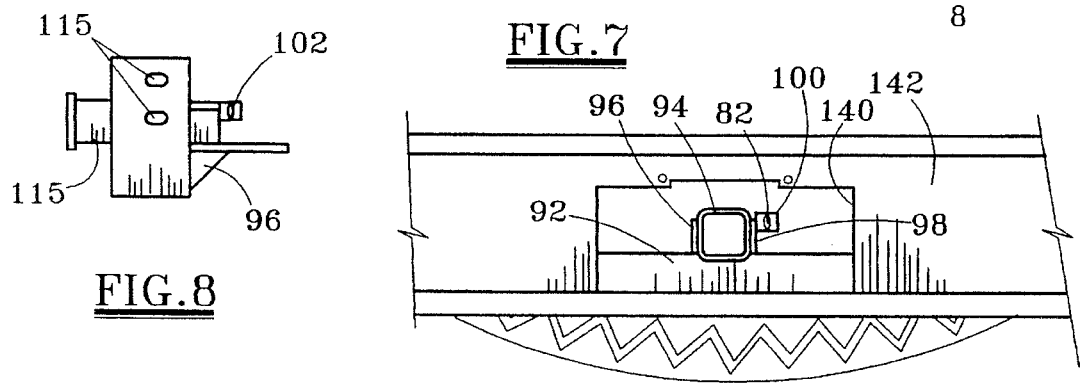

FIG. 8 is an end view of the trailer hitch of FIGS. 6 and 7, taken along line 8—8 of FIG. 7.

Figure 9:
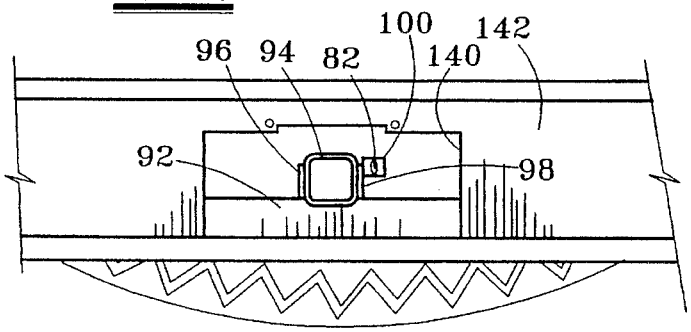

FIG. 9 is a partial rear view of a light truck vehicle showing a bumper with a central opening and with the receiver of the trailer hitch of FIGS. 6–8 in registry with the bumper opening.

Figure 10:
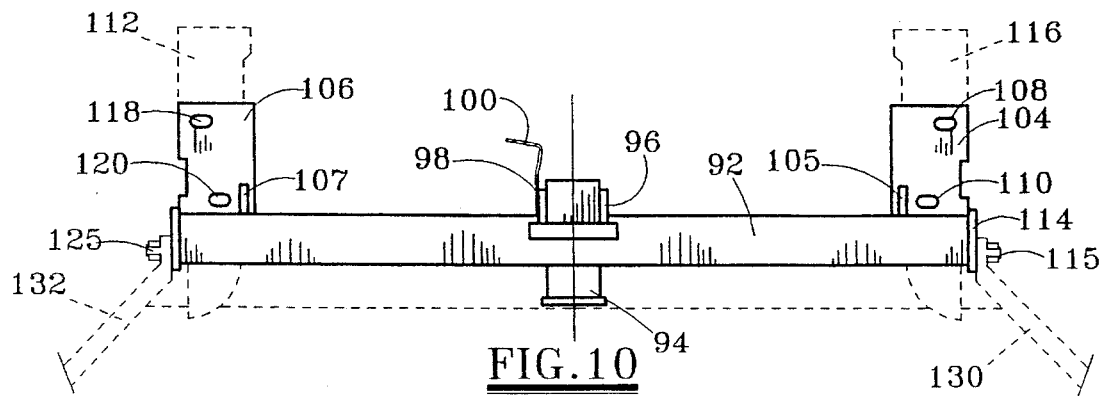

FIG. 10 is a bottom view of the trailer hitch of FIGS. 6–8 with portions of the vehicle frame, corner supports and bumper being shown by way of broken line.

FIG. 11 is a front view of a spare tire locator used in conjunction with the trailer hitches of FIGS. 1 and 6.

FIG. 12 is a top view of the spare tire relocator of FIG. 11.

FIG. 13 is an end view of the spare tire relocator taken along line 13—13 of FIG. 12.

FIG. 14 is a bottom view of a vehicle shown in broken lines with the trailer hitch of FIG. 6 and the spare tire relocator of FIGS. 11–13 being shown in broken line, the Figure also showing the original position of the spare tire by way of broken lines and the relocated position of the spare tire by way of full lines.

DETAILED DESCRIPTION OF THE PREFERRED EMBODIMENT

With reference now to FIGS. 1–5, a preferred embodiment of the present invention takes the form of a hidden, receiver type trailer hitch shown generally at 10 having an elongate, main transverse strut member 12 which is shown particularly in FIGS. 1 and 5 as being of curved configuration in the horizontal plane. Intermediate the transverse strut 12 is fixed a generally tube type trailer hitch receiver 14 preferably by welding or by any other means of connection. The connection of the receiver to the transverse strut is strengthened by a pair of reinforcing plate or web members 16 and 18 which are welded or otherwise fixed to both the receiver and the transverse strut. As shown in broken lines in FIG. 3 the receiver 14 is drilled to define transverse openings 20 on either side thereof which receive a locking pin 22 to secure a hitch drawbar 24 in received assembly therewith, the drawbar being of conventional nature and shown by way of broken lines.

At respective ends of the main transverse strut 12 a pair of horizontal connection plates 26 and 28 are provided for connection with opposed frame members 30 and 32 of the vehicle structure. The horizontal connection plates are preferably welded to respective ends of the transversed strut but may be connected in any other suitable manner therewith. A pair of reinforcing plates or gussets 34 and 36 of generally triangular configuration are welded or otherwise fixed to both the horizontal connection plate 26 and the main transverse strut 12. The horizontal connection plate or flange 26 defines bolt openings 38 and 40 which are adapted to receive connection bolts 40 and 42 as shown in FIG. 5 to secure the horizontal connection plate in fixed assembly with the frame member 30 of the vehicle. Likewise, the horizontal connection plate or flange 28 is connected to a respective extremity of the main transverse strut by welding and is reinforced relative thereto by generally triangular plates or gussets 44 and 46 which are welded both to the horizontal connection plate and to the main transverse strut. As shown in FIG. 1 the horizontal connection plate 28 defines bolt openings 48 and 50 which respectively receive connection bolts 52 and 54 as shown in FIG. 5 for establishing a fixed, structurally sound connection with the frame member 32 of the vehicle.

In order to further enhance the fixed connection of the trailer hitch to the vehicle frame a vertical connection flange 56 is connected to the horizontal connection plate 26, preferably by welding, and defines a pair of vertically oriented bolt holes 58 which receive bolts 60 that interconnect the vertical connection flange with a sidewall structure of the vehicle frame member 30. At the opposite end of the main strut a vertically oriented connection flange 62 is provided having bolt holes that receive bolts 64 for securing the vertical connection flange with a vertical wall of the vehicle frame member 32. The respective horizontal connection plates or flanges and the associated vertical connection flanges cooperatively establish efficient structural connection of the trailer hitch with both of the parallel frame members of the vehicle structure. This character of connection is of significantly greater structural integrity as compared with that of more conventional trailer hitches by eliminating the lever arm that typically exists because conventional trailer hitches must be significantly lowered from the frame to clear the rear bumper. The hidden trailer hitch of this invention can be effectively given a higher classification of load towing capability as compared with more conventional trailer hitch installations because loads applied to the transverse strut are transmitted directly to the frame of the vehicle.

It is desirable that the trailer hitch be provided with a safety chain connection that is exceptionally strong and that the force of the safety chain connection be applied directly to the main transverse strut member 12. As shown in particularly in FIG. 2, an elongate safety chain connection member 66 is welded or otherwise connected to the bottom wall structure of the transverse strut 12. This single depending flange member, which may defined by a length of angle bar, is preferably welded to the bottom wall of the transverse strut. The safety chain connector 66 defines a pair of spaced safety chain openings 68 and 70 which receive the connector hooks of a pair of safety chains that extend from the drawbar of the trailer assembly being towed thereby. Thus, the force of the safety chains, if applied to the trailer hitch, are applied directly to the center portion of the transverse strut so that the load applied by the trailer will be efficiently restrained by the safety chain. Even though loose from the vehicle, the trailer should remain aligned with the vehicle by the bridle effect of the safety chains until the vehicle is brought to a stop.

For operation of the spare tire lift which is typically provided on light trucks an elongate operating crank is typically extended from the rear of the vehicle and is brought into operative engagement with a rotary drive shaft extending from the lift mechanism. Since the trailer hitch is mounted in nested relation just forwardly of the rear bumper 142 or roll pan 72 of the vehicle as shown in FIG. 4, the hitch receiver 14 is positioned in registry with a centrally located license plate opening 74 and normally is hidden from view by a license plate which is pivotally supported by a license plate holder connected by pivotal mount assemblies 76 and 78. Thus, when the spare tire lift is operated the operating crank or rachet must be extended through the central opening 74 of the roll pan 72 or bumper. To provide a guiding function and to support the lift actuator crank or rachet, a lift actuator guide element 80 is fixed to the receiver 14 or to a receiver reinforcing gusset or plate 18 as shown in FIG. 5. The guide member 80 defines an angulated tip having an opening 82 which serves as a guide opening for the lift actuating member.

With reference now to FIGS. 6–10 a hidden, receiver type trailer hitch representing an alternative embodiment of the present invention is shown generally at 90 and differs from the trailer hitch of FIG. 10 only in that an elongate main transverse strut 92 thereof is of straight configuration as opposed to the curved configuration shown in FIG. 1. A generally rectangular, tubular hitch receiver 94 is fixed to the center portion of the transverse strut 92 such as by welding and is strengthened by a pair of reinforcing plate members 96 and 98. A spare tire lift actuator guide 100 is also fixed to the receiver or to the structural gusset or plate and defines an opening 102 serving as a guide receptacle for the lift actuator crank that is typically used. At respective ends of the strut 92 is provided a pair of horizontal connection plates 104 and 106 which permit end portions of the hitch to be directly bolted or otherwise connected to a pair of generally parallel frame members of the vehicle structure. Connection plate 104 defines bolt holes 108 and 110 which receive bolts that secure the connection plate to a vehicle frame member 112. A vertical connection plate 114 is welded both to the horizontal connection plate 104 and to one end of the transverse strut 92 to provide an end connection structure of significant strength for the trailer hitch structure. The vertical plate 114 defines bolt openings through which bolts extend for bolted connection to the sidewall structure of the vehicle frame member 116.

In like manner the opposite end of the transverse strut is adapted for connection to a vehicle frame member 112 by connection bolts that extend through bolt holes 118 and 120 in a horizontal connection plate 106. A vertical connection plate 124 being welded to the horizontal connection plate 106 and to the opposite end of the transverse strut 92 provide for extremely strong connection to the vehicle frame member 112. A pair of bolts 121 secure the horizontal connection plate to the bottom surface of the frame member 112 while bolts 125 secure the vertical connection plate or flange 124 to a sidewall structure of the vehicle frame member 112. Since the horizontal connection plate is bolted directly to the frame member and since the vertical connection plate 124 is fixed directly to the frame member and also to an end of the transverse strut 92 as well as being connected to the horizontal plate 106, a connection of considerable structural integrity is defined between the trailer hitch and the vehicle. Further, since the horizontal connection plates 104 and 106 are connected directly to the frame and directly to the respective ends of the transverse strut almost no lever arm is defined. Accordingly, forces are transmitted efficiently from the trailer hitch directly to the vehicle frame structure. Thus, there is no tendency for any end portion of the trailer hitch to yield or become deformed as significant forces are applied to the hitch structure. When the trailer hitch is bolted to the frame of the vehicle structure, the bolts 117 and 125 also function to secure corner support members of the vehicle structure to the vertical connection plates 114 and 124.

To provide for safe connection of a trailer to the trailer hitch a safety chain receiver element 134, which may be defined by an L-shaped structural element as is evident from FIG. 10, may be fixed by welding to the lower central portion of the elongate transverse strut member 92 and defines a pair of spaced safety chain openings 136 and 138 that receive the respective hooks of a pair of safety chains or a safety chain bridle.

When the trailer hitch is secured to the vehicle frame structure the rectangular receiver 94 will be positioned in registry with a central opening 140 of a decorative vehicle bumper 142. A pivotal license plate support or a closure of any suitable character may be provided to close the opening 140 so that the trailer hitch is hidden from view until its use for trailer towing is needed.

As mentioned above it is desirable to provide a hidden, receiver type trailer hitch for light truck vehicles which is especially adapted to luxury conversion situations and yet effectively permits a full sized wheel and tire assembly to be mounted beneath the bed of the truck. As is typically the case the spare tire lift mechanism with which such trucks are ordinarily provided will not ordinarily support a vehicle tire in stowed position beneath the bed of the pickup truck with a trailer hitch installed between the spare tire and the bumper or roll pan of the vehicle because insufficient space remains to accommodate the spare tire. According to the present invention the spare tire lift mechanism is relocated forwardly a sufficient distance to permit the spare tire to clear the forward most portion of the trailer hitch structure. This is accomplished by providing a spare tire relocator element shown generally at 150 of generally L-shaped elongate configuration having a bottom generally horizontal flange 152 and a vertically oriented transverse flange 154. The vertical flange is of significantly greater dimension then that of the bottom flange 152. The bottom flange defines bolt openings 156 and 158 at its respective extremities for bolted connection to the frame structure of the vehicle. The vertical flange defines a pair of bolt openings 162 which receive the bolts of a conventional spare tire lift which is shown in broken line at 164. The spare tire lift defines a central, horizontally projection shaft 166 which is adapted for engagement by a lift actuator and rotated in order to drive a spare tire lift cable 168 upwardly or downwardly as the case may be for lifting or lowering the spare tire. To shift the lift mechanism 164 forwardly the lift is simply unbolted from its conventional transverse support and is reinstalled in assembly with the replacement spare tire relocator 150. Thus, the wheel and tire assembly is relocated from the position shown in broken line in FIG. 14 to the position shown in full line. In virtually all pickup truck assemblies, especially where full size pickup trucks are employed, there is sufficient forward space for relocation of the spare tire lift in this manner.

In view of the foregoing it is readily apparent that a trailer hitch device has been provided according to the teachings of this invention which permits the installation of a hidden receptacle type hitch behind the bumper or roll pan of luxury truck conversions. The trailer hitch receiver is oriented in registry with a central opening of the vehicle bumper or roll pan and is normally hidden from view when not in use by means of a pivotal license plate support mechanism or a removable cover. When use of the trailer hitch is desired a trailer hitch drawbar will simply be inserted through the opening and into the hitch receiver where it is secured by means of a transverse locking pin. The trailer hitch, together with the spare tire relocator, effectively permits a full size spare tire to be secured beneath the bed of the light truck in position for immediate use when needed.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed:

1. A hidden, receiver type trailer hitch for connection to frame members of a vehicle having a rear end member defining a central opening and a pivotally movable license plate holder and closure for said central opening, and wherein the frame members have horizontal bottom walls and vertical side walls, said trailer hitch comprising:

(a) an elongate transverse strut of generally rectangular cross-sectional configuration defining top, bottom, front and rear walls;

(b) a pair of flat, generally rectangular horizontal connection plates each having a top and bottom generally horizontally oriented surface and being fixed to respective ends of said elongate transverse strut and having said bottom generally oriented surface thereof disposed in face to face relation with said top wall of said elongate transverse strut, said horizontal connection plates defining a plurality of bolt openings for registry with bolt openings in the bottom wall of respective frame members of said vehicle and said top generally horizontally oriented surface of said horizontal connection plates adapted for face to face engagement with said bottom walls of said frame members;

(c) a pair of vertical connection plates being fixed to and extending upwardly from respective horizontal connection plates and defining bolt openings for registry with bolt openings in the side walls of said frame members of said vehicle; and (d) a generally rectangular tubular receiver having top, bottom and side walls being fixed to said elongate transverse strut and being located centrally of said elongate transverse strut, said tubular receiver being oriented in registry with said central opening of said rear end member.

2. The hidden, receiver type trailer hitch of claim 1, further comprising:

structural members extending forwardly and rearwardly of each end of said elongate transverse strut and being connected both to said elongate transverse strut and to respective horizontal connection plates.

3. A hidden, receiver type trailer hitch of a vehicle having a rear end member defining a central opening and a pivotally movable license plate holder and closure for said central opening, and wherein the frame members have horizontal bottom walls and vertical side walls, said trailer hitch comprising:

(a) an elongate transverse strut of generally rectangular cross-sectional configuration defining top, bottom, front and rear walls;

(b) a pair of flat, generally rectangular horizontal connection plates each having a top and bottom generally horizontally oriented surface and being fixed to respective ends of said elongate transverse strut and having said bottom generally oriented surface thereof disposed in face to face relation with said top wall of said elongate transverse strut, said horizontal connection plates defining a plurality of bolt openings for registry with bolt openings in the bottom wall of respective frame members of said vehicle and said top generally horizontally oriented surface of said horizontal connection plates adapted for face to face engagement with said bottom walls of said frame members;

(c) a pair of vertical connection plates being fixed to and extending upwardly from respective horizontal connection plates and defining bolt openings for registry with bolt openings in the side walls of said frame members of said vehicle; and (d) a generally rectangular tubular receiver having top, bottom and side walls and being connected centrally fixed to said elongate transverse strut, said tubular receiver being oriented in registry with said central opening of said rear end member of said vehicle;

(e) pairs of reinforcing plate members being fixed by welding to respective front and rear surfaces of said elongate transverse strut and being fixed by welding to the bottom surface of respective horizontal connection plates.

4. The hidden, receiver type trailer hitch of claim 3, wherein said pairs of reinforcing plate members comprise:

generally triangular reinforcing gussets having connection edges oriented at right angles to one another and being connected by welds respectively to said front and rear surfaces of said elongate transverse strut and to said bottom surface of said horizontal connection plate.

5. The hidden, receiver type trailer hitch of claim 1, further comprising:

means being fixed to respective side walls of said tubular receiver and to said front wall of said elongate transverse strut for reinforcing the connection of said tubular receiver to said elongate transverse strut.

6. The hidden, receiver type trailer hitch of claim 5, wherein said reinforcing means comprises:

a pair of generally vertically oriented reinforcing plates both being connected by welding to said front wall of said elongate transverse strut and to a side wall of said generally rectangular tubular receiver and being oriented in spaced relation with one another.

7. The hidden, receiver type trailer hitch of claim 1, wherein said vehicle includes a spare tire lift mechanism supported by the underside of said vehicle and adapted to support a full size spare tire at a spare tire storage position, said trailer hitch further comprising:

means for relocating the spare tire lift mechanism of said truck forwardly of the conventional position thereof to a position providing sufficient space beneath the vehicle and forwardly of said trailer hitch for storage of a full size spare wheel and tire assembly.

8. The hidden, receiver type trailer hitch of claim 7, wherein said means for relocating said spare tire lift mechanism comprises:

an elongate transverse structural element adapted for connection at respective ends thereof to respective frame members of said vehicle and defining bolt holes intermediate the length thereof for bolted connection of a spare tire lift mechanism thereto.

9. The hidden, receiver type trailer hitch of claim 8, further comprising:

guide means being fixed to said trailer hitch adjacent said receiver and defining a guide opening through which a spare tire lift actuator is received.

10. The hidden, receiver type trailer hitch of claim 1, wherein:

said elongate transverse strut is of curved configuration in the horizontal plane for positioning of an intermediate portion of said elongate transverse strut closer to said rear end member of said vehicle than respective end portions of said elongate transverse strut.

11. A hidden, receiver type trailer hitch for connection to frame members of automotive vehicles having rear end members defining a central opening and a pivotally movable closure for said central opening, and wherein the frame members have horizontal bottom walls and vertical side walls and said vehicle is provided with a spare tire lift mechanism for storage of a full size spare wheel and tire assembly beneath the vehicle at a predetermined location, said trailer hitch comprising:

(a) an elongate transverse strut of generally rectangular cross-sectional configuration defining top, bottom, front and rear walls;

(b) a pair of generally flat horizontal connection plates defining substantially parallel top and bottom surfaces being fixed to said top wall of respective ends of said elongate transverse strut with said bottom surfaces thereof being oriented in face to face relation with said top wall of said elongate transverse strut, said horizontal connection plates projecting both forwardly and rearwardly of said respective ends of said elongate transverse strut and defining a plurality of bolt openings for registry with bolt openings in the bottom wall of respective frame members of said vehicle said top surfaces of said horizontal connection plates being adapted for face to face engagement with said horizontal bottom walls of said frame members;

(c) a pair of vertical connection plates being fixed to and extending upwardly from respective horizontal connection plates at locations rearwardly of said elongate transverse strut and defining bolt openings for registry with bolt openings in the side walls of said frame members of said vehicle;

(d) a generally rectangular tubular receiver having top, bottom and side walls and being fixed centrally of said elongate transverse strut, said tubular receiver adapted to be oriented in registry with said central opening of said rear end member of said vehicle; and (e) a lift support element adapted to be fixed to said frame members of said vehicle for relocating the spare tire lift mechanism of said vehicle forwardly of said predetermined location thereof to a position providing sufficient space beneath the vehicle and forwardly of said trailer hitch for storage of a full size spare wheel and tire assembly between said frame members and forwardly of said hidden, receiver type trailer hitch.

12. The hidden, receiver type trailer hitch of claim 11, further comprising:

structural members extending forwardly and rearwardly of each end of said elongate transverse strut and being connected both to said elongate transverse strut and to respective horizontal connection plates.

13. The hidden, receiver type trailer hitch of claim 12, wherein said structural members comprise:

pairs of reinforcing plate members being fixed by welding to respective front and rear surfaces of said elongate transverse strut and being fixed by welding to the bottom surface of respective horizontal connection plates.

14. The hidden, receiver type trailer hitch of claim 13, wherein said pairs of reinforcing plate members comprise:

generally triangular reinforcing gussets having connection edges oriented at right angles to one another and being connected by welds respectively to said front and rear surfaces of said elongate transverse strut and to said bottom surface of said horizontal connection plate.

15. The hidden, receiver type trailer hitch of claim 11, further comprising:

means reinforcing the connection of said receiver to said elongate transverse strut.

16. The hidden, receiver type trailer hitch of claim 15, wherein said reinforcing means comprises:

a pair of generally vertically oriented reinforcing plates both being connected by welding to said front wall of said elongate transverse strut and to a side wall of said generally rectangular tubular receiver and being oriented in spaced relation with one another.

17. The hidden, receiver type trailer hitch of claim 11, wherein said support element comprises:

an elongate transverse structural element adapted for connection at respective ends thereof to respective frame members of said vehicle and defining bolt holes intermediate the length thereof for bolted connection of a spare tire lift mechanism thereto.

18. The hidden, receiver type trailer hitch of claim 17, further comprising:

guide means being fixed to said trailer hitch adjacent said receiver and defining a guide opening through which a spare tire lift actuator is received.

19. The hidden, receiver type trailer hitch of claim 11, wherein:

said elongate transverse strut is of curved configuration in the horizontal plane for positioning of an intermediate portion of said elongate transverse strut closer to said rear end member of said vehicle than respective end portions of said elongate transverse strut.

* * * * *